July 25, 1950

J. L. CLARK ET AL 2,516,552

METHOD OF MAKING INFLATABLE TOYS

Filed July 19, 1948

INVENTORS
JAMES L. CLARK
MASON E. HORTON

BY *Young Wright*

ATTORNEYS

July 25, 1950

J. L. CLARK ET AL 2,516,552

METHOD OF MAKING INFLATABLE TOYS

Filed July 19, 1948

INVENTORS
JAMES L. CLARK
MASON E. HORTON

BY *Young Wright*

ATTORNEYS

Patented July 25, 1950

2,516,552

UNITED STATES PATENT OFFICE 2,516,552

METHOD OF MAKING INFLATABLE TOYS

James L. Clark and Mason E. Horton, Milwaukee, Wis., assignors to Clarvan Corporation, Milwaukee, Wis.

Application July 19, 1948, Serial No. 39,524

8 Claims. (Cl. 154—85)

This invention appertains to the means and the method of making inflatable articles, such as toy figures, balls and the like.

One of the primary objects of this invention is to produce an article which can be economically and successfully placed upon the market in a permanently inflated condition, so that the necessity of the customer's blowing up the article after purchase is eliminated, and whereby the escape of the inflating medium through a filling neck or opening is prevented.

Another salient object of this invention is the provision of the method and means for forming a permanently inflated article which consists in electronically heat sealing layers of vinyl or similar plastic sheets together to form a desired welded or fused outline by means of a combination sealing and cutting die, which corresponds identically to the shape of the toy.

A further salient object of the invention is the provision of means for initially and permanently sealing plastic sheets to form an inflated article around a desired outline with a gas releasing medium disposed between the sheets at the time of the sealing thereof, so that after sealing and upon the releasing of the gas, the toy or other article will be inflated to the desired degree.

A further important object of the invention is the method and means for producing a permanently inflated article at the time of the manufacture thereof which consists in the placing of a gas releasing pellet, at normal room temperatures, between the layers or sheets and then hermetically sealing the layers or sheets together around a desired outline.

A still further object of the invention is to utilize cutting pressure at the time of the electronically heat sealing so as to cause the fluent thermoplastic to flow interiorly of the fused seam to provide a thickened rib interiorly of the seam, and thereby reduce the danger of cutting the body portion during the forming of the article.

With these and other objects in view, the invention consists in the novel forming of inflated articles as will be hereinafter more fully described and claimed, and illustrated in the accompanying drawings, in which drawings:

Figure 1:
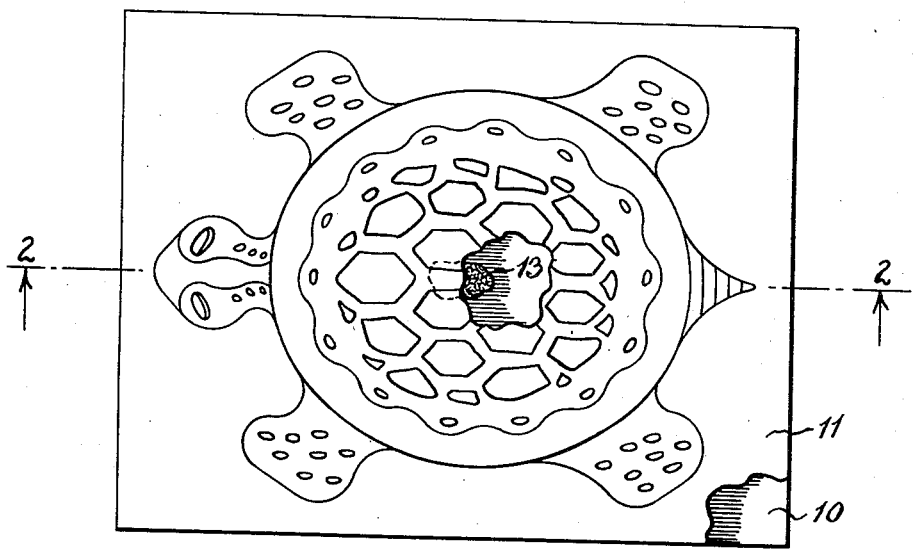
Figure 1 is a top plan view showing the first step in my method of forming the permanently inflated article, the view showing more particularly a pair of thermoplastic sheets or layers arranged in superimposed relation with the pellet between the sheets, the sheets being decorated to simulate a desired figure, parts of the view being shown broken away.
Figure 2:
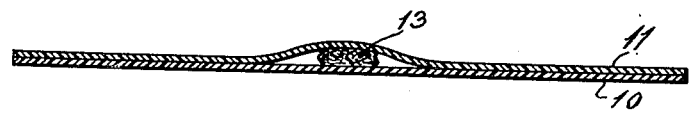
Figure 2 is a longitudinal, sectional view taken on the line 2—2 of Figure 1, looking in the direction of the arrows.
Figure 3:
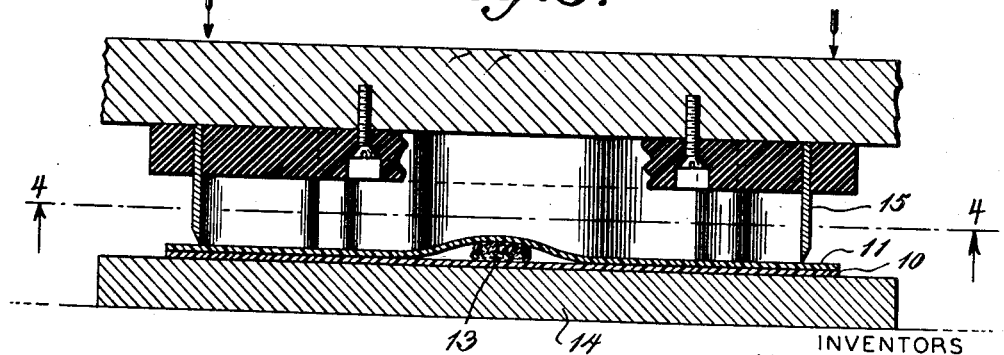
Figure 3 is a longitudinal, sectional view showing another step in the method of forming the inflated article.
Figure 4:
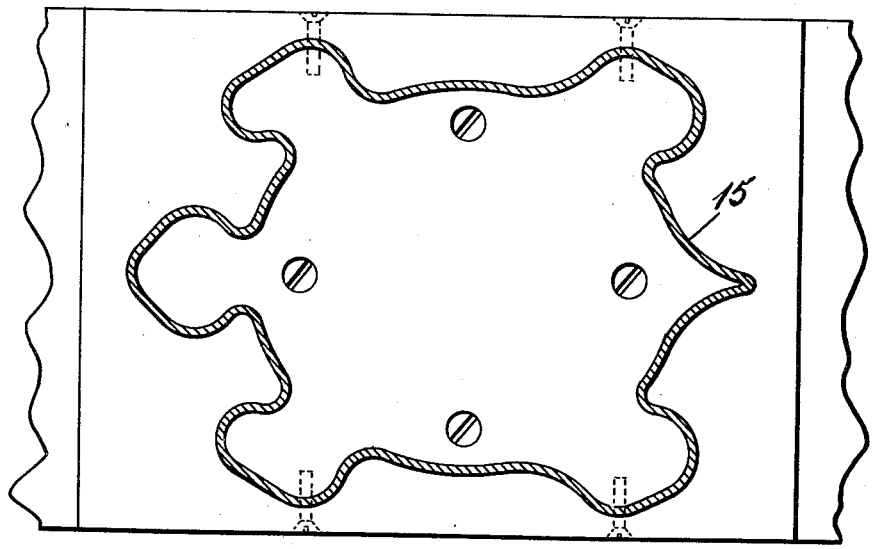
Figure 4 is a horizontal, sectional view through the cutting and sealing die taken on the line 4—4 of Figure 3, looking in the direction of the arrows.
Figure 5:
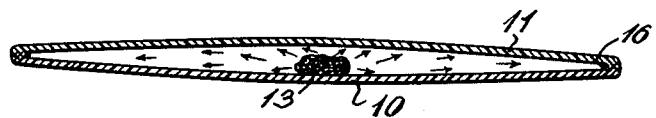
Figure 5 is a longitudinal, sectional view through the article after heat sealing and cutting of the layers or sheets, the view further illustrating the releasing of the gas from the pellet.
Figure 6:
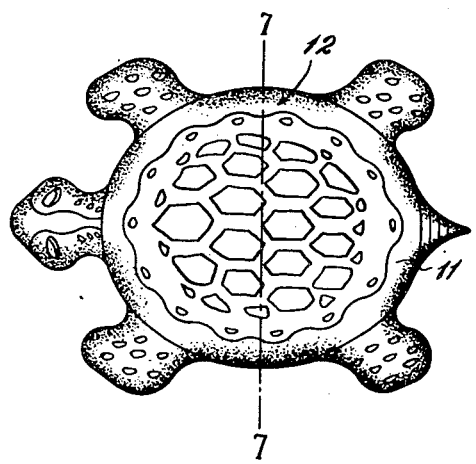
Figure 6 is a top plan view of the completed article, the view being on a smaller scale than Figures 1 to 5 inclusive.
Figure 7:
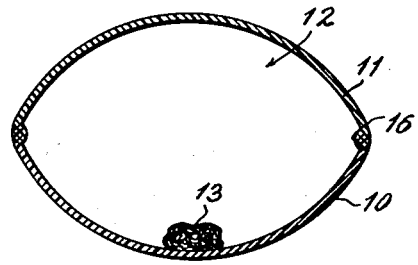
Figure 7 is a transverse, sectional view through the completed article taken on the line 7—7 of Figure 6.

Referring to the drawings in detail, wherein similar reference characters designate corresponding parts throughout the several views, the numerals 10 and 11 indicate a pair of like sheets which are utilized in the forming of my permanently inflated article, indicated by the reference character 12 in Figures 6 and 7 of the drawings. The sheets 10 and 11 can be formed from thermoplastic material, such as vinyl film. The outer faces of the sheets 10 and 11 can be treated so as to stimulate a desired figure, such as a turtle, shown in the present drawings. Obviously, the method and means can be employed for forming other inflated objects, such as a ball.

A pellet 13 of carbon dioxide or other substance having like qualities, as will be later set forth, is placed between the sheets 10 and 11.

After the sheets 10 and 11 have been placed in facial relation, with the pellet 13 there between, these sheets are fused or welded together around the outline of the figure represented on said sheets. Hence, the sheets are laid on a platen 14 and a combined cutting and sealing die 15 corresponding to the shape of the desired article is brought down into firm contact with the sheets with the desired pressure. This pressure is continued until the sheets are severed. It is preferred to fuse or weld the sheets 10 and 11 together by an electronic heat sealing process and, consequently, the combination cutting and sealing die 15 and the platen 14 constitute the electrodes of an electronic equipment (not shown).

By bringing the electrode cutting and sealing die down against the sheets with pressure, the fluent thermoplastic material forming the sheets directly between the die 15 and the platen 14 intermingles and the fluent material is forced inwardly and outwardly by the die and the material flowing inward beyond the die forms an interior thickened, rounded, strengthening rib 16. This is important, as will be later set forth. The electrode cutting and sealing die 15 is so-formed as to fuse and cut the sheets together around the figure on the sheets. As the fluent material flows inward all danger of not bringing about the correct sealing is eliminated.

In actual practice, the pellet 13 can be made from absorbent material saturated with liquid air or nitrogen, or similar material which will when pressure is reduced, and it is subjected to room temperatures, turn from its liquid state into a gas.

From the foregoing description, it can be seen that the invention consists briefly in the method and means of sealing multiple layers of material together with the sealed in space under super-atmospheric pressure by the placing of a gas releasing medium between the layers before sealing. The invention further comprehends the sealing and cutting by a single step which defines the exact shape of the desired article.

Changes in details may be made without departing from the spirit or the scope of this invention, but what we claim as new is:

1. The method of forming a permanently inflated article, which consists in first placing a pellet including a gas releasing medium between superimposed thermoplastic sheets and second heat sealing the sheets together around a desired outline to completely surround the gas releasing medium.

2. The method of forming a permanently inflated article, which consists in first placing a pellet including a gas releasing medium between superimposed thermoplastic sheets and second heat sealing the sheets together around a desired outline to completely surround the gas releasing medium, with the heat sealing die corresponding exactly to the desired outline of the figure.

3. The method of forming a permanently inflated article at the time of the manufacture thereof, which consists in first placing a pellet including a gas releasing medium between a pair of superimposed thermoplastic sheets and second simultaneously heat sealing and cutting the sheets around a desired outline to completely surround and enclose the gas releasing medium.

4. The method of producing hollow articles by sealing multiple layers of material together with the sealed in space under super-atmospheric pressure which consists in the placing of a gas releasing medium between thermoplastic layers before sealing, and then effecting a completely continuous line of hermetic seal between the lamina entirely around the gas releasing medium.

5. The method of producing hollow articles by sealing multiple layers of material together with the sealed in space under super-atmospheric pressure which consists in the placing of a gas releasing medium between thermoplastic layers before sealing, and then effecting a completely continuous line of hermetic seal between the lamina entirely around the gas releasing medium, the hermetic sealing defining the exact contour of the article.

6. The method of producing hollow articles by sealing multiple layers of thermoplastic material together with the sealed in space under super-atmospheric pressure which consists in first the placing of a gas releasing medium between the thermoplastic layers before sealing and second effecting a completely continuous line of hermetic seal between the layers and entirely around the gas releasing medium and simultaneously cutting the lines.

7. The method of producing hollow articles by sealing multiple layers of thermoplastic material together with the sealed in space under super-atmospheric pressure which consists in first the placing of a gas releasing medium between the thermoplastic layers before sealing, second, effecting a completely continuous line of hermetic seal between the layers and entirely around the gas releasing medium and simultaneously cutting the lines, the sealing and cutting constituting the means by which the shape of the article is determined.

8. The method of producing hollow articles by sealing multiple layers of thermoplastic material together with the sealed in space under super-atmospheric pressure which consists in first the placing of a gas releasing medium between the thermoplastic layers before sealing, second, effecting a completely continuous line of hermetic seal between the layers and entirely around the gas releasing medium and simultaneously cutting the lines, the sealing and cutting constituting the means by which the shape of the article is determined, said sealing and cutting providing a definite line of cleavage between the periphery of the article and the unused border of lamina surrounding the contour line of the seal.

J. L. CLARK.
M. E. HORTON.

REFERENCES CITED

The following references are of record in the file of this patent:

UNITED STATES PATENTS

| Number | Name | Date |
|---|---|---|
| 1,352,383 | Riley | Sept. 7, 1920 |
| 1,816,472 | Dorogi | July 28, 1931 |
| 1,825,308 | Dorogi | Sept. 29, 1931 |
| 1,834,078 | Stein | Dec. 1, 1931 |
| 1,869,550 | Dorogi | Aug. 2, 1932 |
| 2,432,412 | Hacklander | Dec. 9, 1947 |
| 2,448,173 | Cowan | Aug. 31, 1948 |
| 2,470,990 | Kennedy | May 24, 1949 |
| 2,478,771 | Mafko | Aug. 9, 1949 |

OTHER REFERENCES

"Blowing" Modern Plastics, October 1943, pp. 96 and 97.